Sept. 29, 1953 J. BALDINUS 2,653,798
HEATING AND VENTILATING DEVICE FOR AUTOMOTIVE VEHICLES
Filed May 21, 1952 3 Sheets-Sheet 1
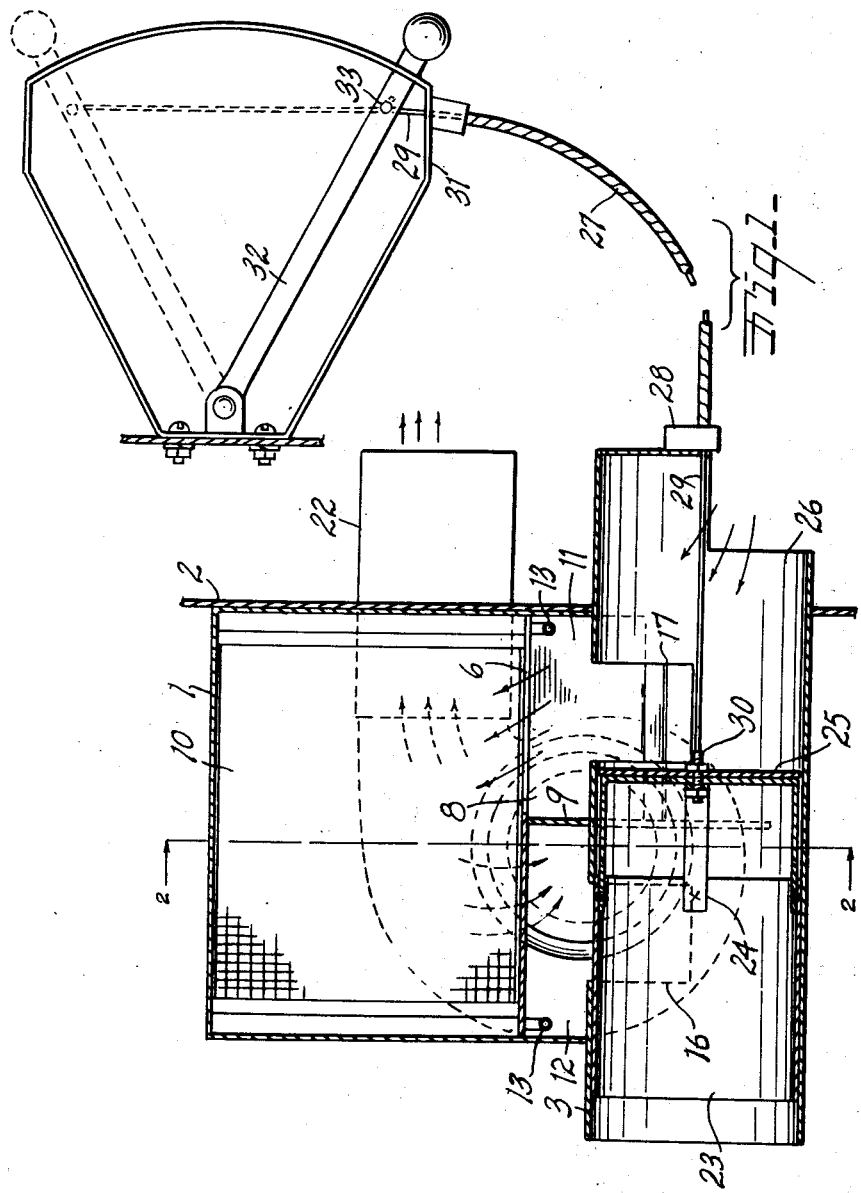
INVENTOR.
Joseph Baldinus
BY
ATTORNEY.

Sept. 29, 1953 J. BALDINUS 2,653,798
HEATING AND VENTILATING DEVICE FOR AUTOMOTIVE VEHICLES
Filed May 21, 1952 3 Sheets-Sheet 2
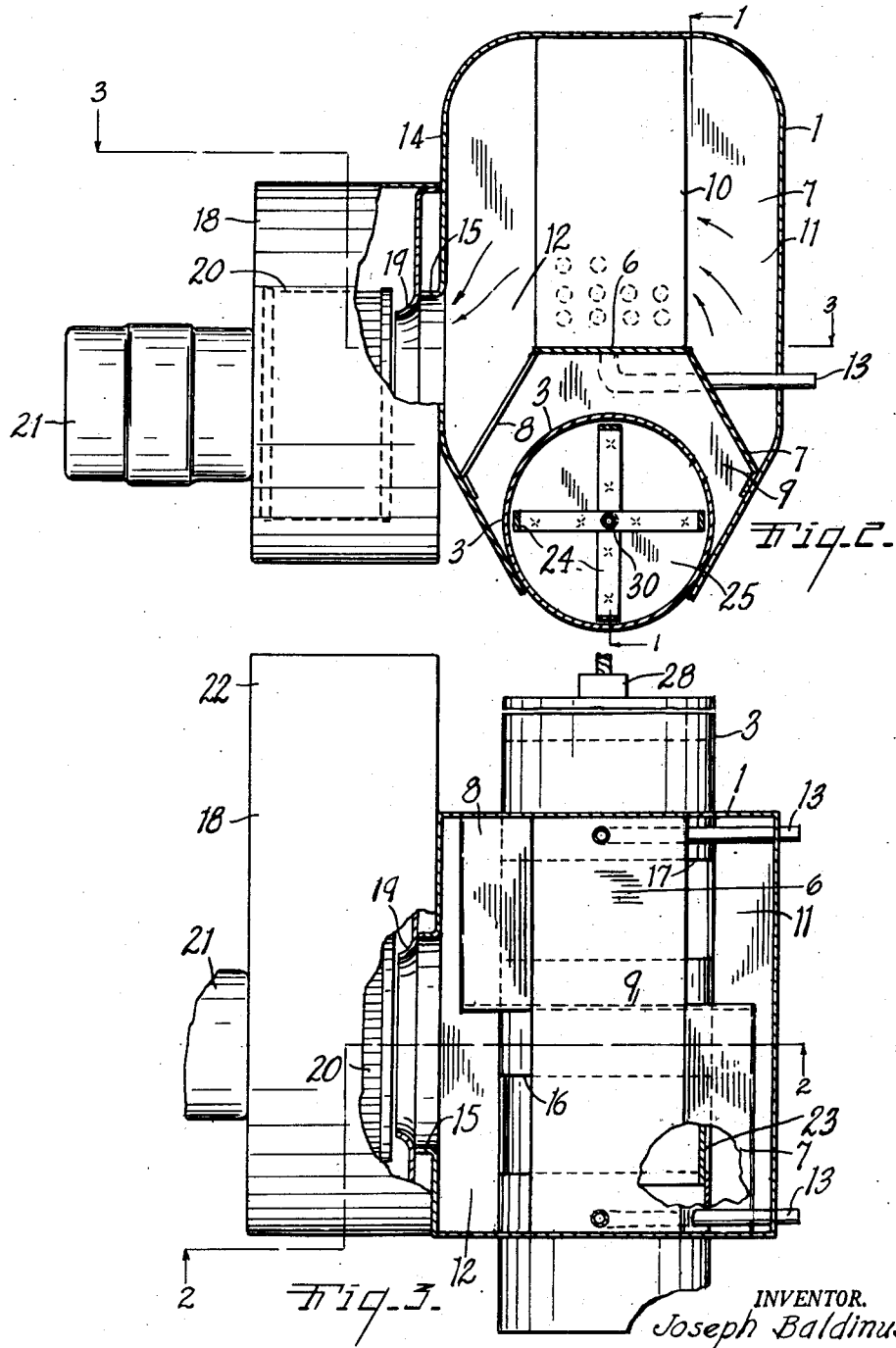
INVENTOR.
Joseph Baldinus
BY
ATTORNEY

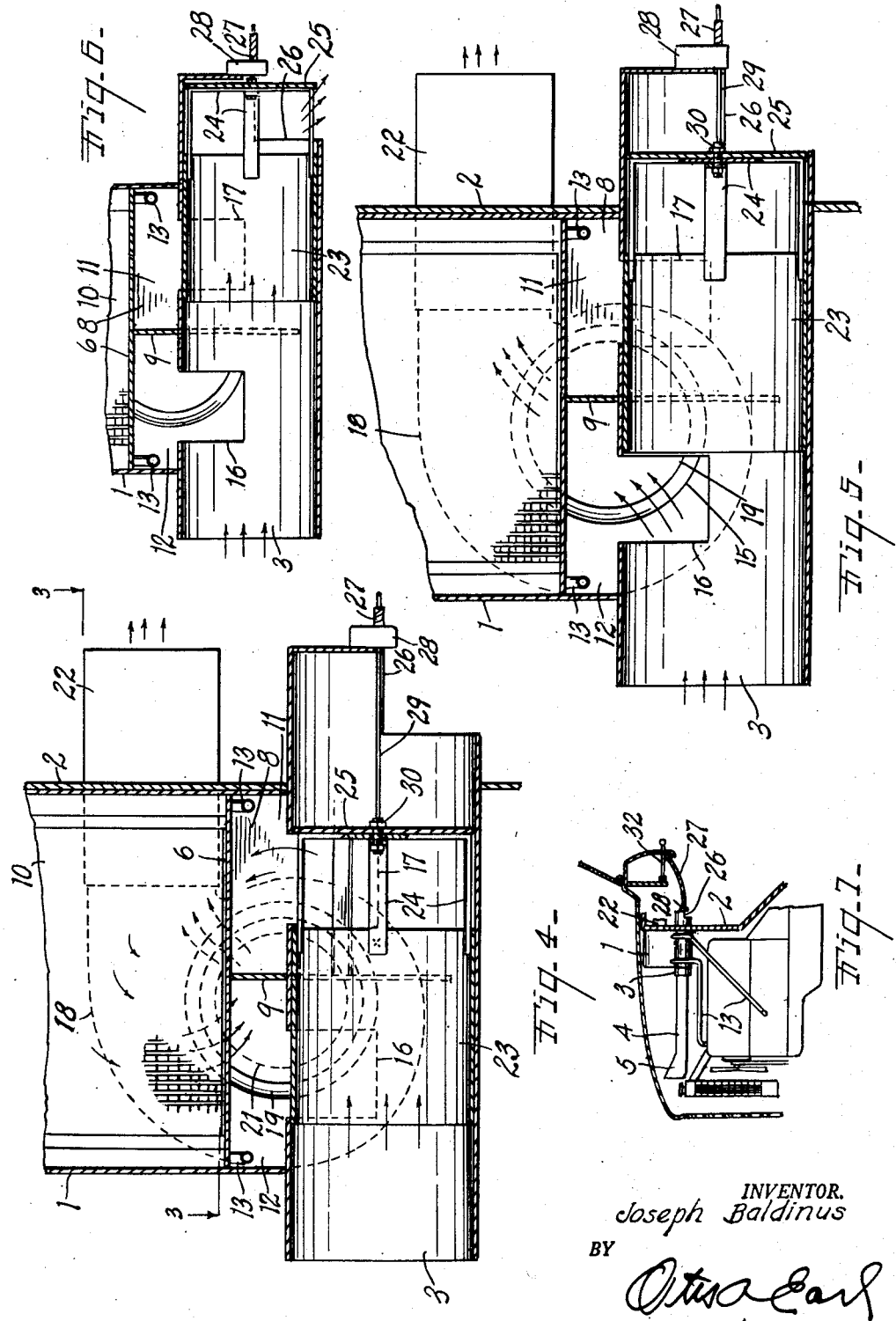

Patented Sept. 29, 1953

2,653,798

UNITED STATES PATENT OFFICE 2,653,798

HEATING AND VENTILATING DEVICE FOR AUTOMOTIVE VEHICLES

Joseph Baldinus, Cadillac, Mich., assignor to Kysor Heater Company, Cadillac, Mich., a corporation of Michigan Application May 21, 1952, Serial No. 289,181

10 Claims. (Cl. 257—137)

This invention relates to improvements in heating and ventilating device for automotive vehicles.

The principal objects of this invention are:

First, to provide a heating and ventilating device for automotive vehicles, generally and particularly adapted for trucks, to heat and ventilate the driver's compartment or cab with either fresh or recirculated air in varying portions.

Second, to provide a heating and ventilating device which will supply hot or cold fresh air from the exterior of a vehicle to the interior thereof either by the action of a blower or by the action of the air stream created by movement of the vehicle.

Third, to provide a heating and ventilating device for automotive vehicles which is readily adjustable for a variety of heating and ventilating actions and which is compact and easily and inexpensively manufactured.

Other objects and advantages of the invention will be apparent from a consideration of the following description and claims.

The drawing of which there are three sheets illustrates a highly practical form of the device in various adjusted positions.

Fig. 1 is a vertical, longitudinal, cross sectional view through the heater with portions thereof attached to supporting portions of a vehicle.

Fig. 2 is a transverse cross sectional view through the heater taken along the plane of the line 2—2 in Figs. 1 and 3.

Fig. 3 is a horizontal cross sectional view through the heater taken along the plane of the line 3—3 in Figs. 2 and 4.

Fig. 4 is a fragmentary longitudinal cross sectional view similar to Fig. 1 and illustrating the device in a different adjusted position.

Fig. 5 is a fragmentary longitudinal cross sectional view illustrating the device in still another adjusted position.

Fig. 6 is a fragmentary longitudinal cross sectional view illustrating the device in still another adjusted position.

Fig. 7 is a fragmentary longitudinal cross sectional view through a motor vehicle illustrating a possible method of mounting the heater and ventilator.

The device comprises a box like casing 1 adapted to be secured at its rear wall to the front or outer side of the fire wall or dash panel 2 of an automotive vehicle. The lower portion of the casing 1 tapers downwardly and inwardly and receives a cylindrical air induction tube 3 that extends longitudinally through the casing and is adapted to project through the dash panel 2 at its rear end. As is illustrated in Fig. 7 the forward end of the air induction tube 3 is adapted to be connected to an air feed pipe 4 extending forwardly to an inlet mouth 5 positioned toward the front of the vehicle where it will receive air from an opening in the front of the vehicle.

A panel 6 extends longitudinally and horizontally through the middle of the casing 1. The forward end of the panel 6 has a downwardly inclined panel 7 secured to one side thereof and supported from the side of the casing 1. The rear end of the panel 6 has an oppositely inclined panel 8 secured thereto and supported from the opposite side of the casing. A partition 9 extends transversely and vertically within the casing below the panel 6 and along the top and sides of the induction tube between the inner ends of the panels 7 and 8. A heat exchange unit such as a hot water heater or radiator 10 extends vertically and longitudinally through the upper portion of the casing and is supported on the panel 6. The panels 6, 7, 8 and 9 thus coact with the radiator and the tube 3 to divide the inside of the casing into an inlet chamber 11 and an outlet chamber 12. Pipes for conducting hot water to and from the radiator 10 are indicated conventionally at 13. The left side wall 14 of the casing 1 has an outwardly flanged circular opening 15 therein positioned to communicate with the outlet chamber 12.

The air induction tube 3 is provided with a first segmental opening in the wall thereof indicated at 16 and opening from the tube directly to the outlet chamber 12. A second segmental opening 17 in the induction tube opens to the inlet chamber 11. Thus air entering the device through the induction tube 3 may pass through the opening 16 and chamber 12 directly to the opening 15 in the side of the casing. Alternatively air may pass through the opening 17 to the inlet chamber 11 and advance through the heat exchanger 10 to the opening 15.

Mounted on the side of the casing 1 and over the outlet opening 15 is a blower housing 18 having an inlet opening 19 registering with the outlet opening 15 of the casing. A centrifugal blower wheel 20 is rotatable within the casing 18 and arranged to be driven by the motor 21 as will be readily understood. The discharge end of the blower housing 18 is extended rearwardly in a delivery tube 22 which is also adapted to project rearwardly through the dash 2 of the vehicle.

In order to control the flow of air through the induction tube 3, the tube is provided with a cylindrical valve element 23 which is axially slidably and sealingly mounted within the tube. The valve element 23 is of such a length that it will close over either one of the openings 16 or 17 in the induction tube without obstructing the other. Spaced rearwardly from the valve element 23 and connected thereto as by the crossed U-shaped straps 24 is a circular plate 25 which forms an adjustable closure for the inner end of the induction tube. The plate 25 is spaced from the rear of the valve element 23 by a distance at least as great as the length of the opening 17 in the induction tube so that the closure plate 25 can be adjusted with the valve element to close off the rear end of the induction tube while permitting free air to flow through the valve element and the opening 17. The rear or inner end of the induction tube is cut away or notched as at 26, thus creating a rear opening from the air induction tube directly into the interior of the vehicle. By moving the valve element and plate 25 rearwardly to uncover the opening formed by the notch 26, it is possible to direct fresh air through the induction tube directly into the vehicle.

In order to shift the valve element 23 axially of the induction tube, a flexible Bowden cable 27 has its outer casing anchored to the rear end of the induction tube as at 28 while the inner wire thereof 29 is connected to the plate 25 at 30. The outer end of the cable is suitably anchored to a fixed bracket 31 having a control lever 32 pivotally mounted thereon. The other end of the wire 29 is connected to the lever at 33 to adjust the position of the valve element.

Fig. 1 illustrates the adjusted position of the heater in which the plate 25 closes off the induction tube forwardly of the opening 17 while the valve element 23 closes off the opening 16. The air from within the vehicle can be drawn through the notched rear end 26 of the induction tube and the openings 17 to the inlet chamber 11 where the air will be drawn through the heat exchange element 10. After it passes through the heat exchange element the air is drawn by the blower through the openings 15 and 19 for redelivery to the inside of the vehicle.

A first rearward adjustment of the valve element and plate 25 will close off the rear end of the induction tube and bring the opening 17 into the registry with the open rear end of the valve element as is shown in Fig. 4. In this position fresh outside air is drawn through the heat exchanger and delivered to the inertior of the vehicle either by operation of the blower or by reason of the forward motion of the vehicle causing air to be forced through the mouth 5 and inlet tube 4. A further partial rearward adjustment of the valve element partially opens both openings 16 and 17 to the tube 3 to mix fresh cold and fresh hot air for introduction into the vehicle.

A second rearwardly adjusted position of the valve element illustrated in Fig. 5 opens the opening 16 in the induction tube to the outlet chamber 12 so that fresh outside air may be forced directly through the induction tube to the blower 18 for delivery to the interior of the vehicle without being heated. This flow of air may be induced by motion of the vehicle or by operation of the blower. The rear end of the valve element 23 closes the rear opening 17 in the induction tube and closure plate 25 closes the rear end of the induction tube just forwardly of the notch 26.

In the extreme rearwardly adjusted position of the valve element 23 as shown in Fig. 6, the valve element still closes the rear opening 17 in the induction tube but the closure plate 25 is moved rearwardly, thus uncovering the notched rear end 26 of the induction tube to permit direct air flow through the induction tube to within the vehicle. In this position fresh air will be introduced directly into the vehicle by reason of forward motion of the vehicle. A by-pass passage for fresh air remains open through the opening 16 and the blower but this passage does not normally carry as much air as the path of least resistance is through the open rear end of the induction tube.

A highly practical form of the heater and ventilator device has thus been described together with the various adjustments that can be made therein. It is believed that this description will permit others to reproduce or manufacture the same or similar devices without further disclosure. Various adaptations and modifications of the disclosed form of the invention may be made without departing from the spirit of the invention. The description is intended as an example of the invention as defined in the following claims and not as a definition of the limits of the invention.

Having thus described my invention, what I claim as new and desire to secure by Letters Patent is:

1. A heater and ventilator for an automotive vehicle comprising, a casing adapted to be secured to a wall of the vehicle and on the outer side thereof from the space to be heated, a cylindrical induction tube extending longitudinally through the lower portion of said casing and having one open end adapted to extend through said wall, said tube having longitudinally spaced openings formed therein opening into the front and rear of said casing, a heat exchange element positioned in the upper portion of said casing, walls coacting with said element and said tube and dividing the casing into inlet and outlet chambers with the forward opening in said tube opening into the outlet chamber and the rear opening in said tube opening into the inlet chamber, a blower mounted on the side of said casing and having an inlet opening to said outlet chamber, a delivery tube on said blower adapted to extend through said wall of said vehicle, a tubular valve element slidably mounted in said induction tube and being of such a length as to close one but not both of the openings in said induction tube, a closure for said induction tube connected to the rear end of said valve element and spaced therefrom by a distance as great as the length of the opening in said induction tube to said inlet chamber whereby said element may be positioned to close the opening to said outlet chamber while said closure closes said tube rearwardly of the opening to said inlet chamber, and means for selectively shifting said valve element longitudinally of said induction tube.

2. A heater and ventilator for an automotive vehicle comprising, a casing adapted to be secured to a wall of the vehicle and on the outer side thereof from the space to be heated, an induction tube extending through said casing at the bottom thereof and having one open end adapted to extend through said wall, a transverse partition embracing said tube and dividing the lower portion of said casing into front and rear chambers, said tube having openings formed therein opening into each of said chambers, a heat exchange element positioned in the upper portion of said casing and dividing the same into inlet and outlet sides, a plate supporting said element in said casing and having a downturned flange along one side extending to the side of said casing between one end thereof and said partition, a second downturned flange on the other side of said plate and extending to the other side of said casing between the other end thereof and said partition, said flanges restricting said front chamber to the outlet side of said casing and restricting said rear chamber to the inlet side of said casing, a blower mounted on the side of said casing and having an inlet opening to the outlet side of said casing, a delivery tube on said blower adapted to extend through said wall, a tubular valve element slidably mounted in said induction tube and being of such a length as to close one but not both of the openings in said induction tube, a closure for said induction tube connected to the rear end of said valve element and spaced therefrom by a distance as great as the length of the opening in said induction tube to said rear chamber whereby said element may be positioned to close the opening to said front chamber while said closure closes said tube rearwardly of the opening to said rear chamber, and means for selectively shifting said valve element longitudinally of said induction tube.

3. A heater and ventilator for an automotive vehicle comprising, a casing adapted to be secured to a wall of the vehicle and on the outer side thereof from the space to be heated, a cylindrical induction tube extending longitudinally through said casing and having an open rear end adapted to extend through said wall, a heat exchange element positioned in said casing and extending from end to end thereof parallel to said tube, partitions in said casing supporting said element and coacting therewith and with said tube to divide said casing into an inlet chamber embracing the rear of said tube and an outlet chamber embracing the front of said tube, said tube having openings formed therein opening into each of said chambers, a blower mounted on the side of said casing and having an inlet opening to said outlet chamber, a delivery tube on said blower adapted to extend through said wall, a tubular valve element slidably mounted in said induction tube and being of such a length as to close one but not both of the openings in said induction tube, a closure for said induction tube connected to the rear end of said valve element and spaced therefrom whereby said element may be positioned to close the opening to said outlet chamber while said closure closes said tube rearwardly of the opening to said inlet chamber, and means for selectively shifting said valve element longitudinally of said induction tube.

4. A heater and ventilator for an automotive vehicle comprising, a casing having downwardly tapered sides and adapted to be secured at one end to a wall of the vehicle and on the outer side thereof from the space to be heated, an induction tube extending longitudinally through the tapered lower portion of said casing and having an open rear end adapted to extend through said wall, a plate extending between the ends of said casing in spaced relationship above said tube, a transverse partition embracing said tube and supporting the mid-portion of said plate, side flanges on opposite sides and opposite ends of said plate extending downwardly to the sides of said casing and from said partition to opposite ends of said casing, said flanges and partition co- acting with said plate to divide said casing into inlet and outlet chambers, said tube having openings formed therein opening into each of said chambers, a heat exchange element positioned on said plate and sealed to the walls of said casing between said inlet and outlet chambers, a blower mounted on the side of said casing and having an inlet opening to said outlet chamber, a delivery tube on said blower adapted to extend through said wall, a tubular valve element slidably mounted in said induction tube and being of such a length as to close one but not both of the openings in said induction tube, a closure for said induction tube connected to the rear end of said valve element and spaced therefrom whereby said element may be positioned to close the front opening in said tube while said closure closes said tube rearwardly of the rear opening in said tube, and means for selectively shifting said valve element longitudinally of said induction tube.

5. A heater and ventilator for an automotive vehicle comprising, a casing having side walls, an induction tube extending longitudinally through said casing and having an open rear end extending beyond said casing and adapted to extend through a panel to a space to be heated, a plate extending from end to end of said casing in spaced relation to said tube, a transverse partition embracing said tube and extending between the said walls of said casing and the mid-section of said plate, said plate having two flanges on opposite sides and opposite ends thereof extending to the side walls of said casing and between said partition and the opposite ends of said casing to form inlet and outlet chambers around opposite ends of said tube, said tube having openings formed therein opening to each of said chambers, a heat exchange element positioned on said plate and sealed to the walls of said casing between said inlet and outlet chambers, a blower mounted on said casing and having an inlet opening to said outlet chamber, a delivery tube on said blower adapted to extend through said panel, a tubular valve element slidably mounted in said induction tube and being of such a length as to close one but not both of the openings in said induction tube, a closure for said induction tube connected to the rear end of said valve element and spaced therefrom whereby said element may be positioned to close the opening to said inlet chamber while said closure exposes and opens the open rear end of said tube, and means for selectively shifting said valve element longitudinally of said induction tube.

6. A heater and ventilator for an automotive vehicle comprising, a casing, a first partition dividing said casing into two longitudinally extending compartments, an induction tube extending longitudinally through one of said longitudinal compartments and having an open rear end extending beyond said casing and adapted to extend through a wall to a space to be heated, a second partition dividing said one compartment into front and rear chambers, said tube having openings formed therein opening into each of said chambers, a heat exchange element positioned in the other of said compartments, and dividing the same into inlet and outlet sides, said first partition having an opening formed therein between said rear chamber and the inlet side of said other compartment, said first partition further having another opening formed therein between said front chamber and the outlet side of said other compartment, a blower mounted on said casing and having an inlet opening to the outlet side of said other compartment, a delivery tube on said blower adapted to extend through said wall, a tubular valve element slidably mounted in said induction tube and being of such a length as to close one but not both of the openings in said induction tube, a closure for said induction tube connected to the rear end of said valve element and spaced therefrom whereby said element may be positioned to close the opening to said rear chamber while said closure exposes and opens the open rear end of said tube, and means for selectively shifting said valve element longitudinally of said induction tube.

7. In an automotive vehicle having a panel separating the driver's cab from the exterior of the vehicle, a heater and ventilator comprising, a casing secured to said panel and on the outer side thereof from the cab, a first partition dividing said casing into two compartments, an induction tube extending through one of said compartments and having one end extending through said panel, a second partition dividing said one compartment into front and rear chambers, said tube having openings formed therein opening into each of said chambers and into said cab, a heat exchange element positioned in the other of said compartments and dividing the same into inlet and outlet sides, said first partition having an opening formed therein between said rear chamber and the inlet side of said other compartment, a blower mounted on said casing and having an inlet opening communicating with said front chamber and the outlet side of said other compartment, a delivery tube on said blower extending through said panel, a tubular valve element adjustably mounted in said induction tube and adapted to selectively close the openings in said induction tube to said chambers, said valve element having a rear closure portion coacting with the rear opening in said tube whereby said element may be positioned to close the opening to said rear chamber while said rear closure exposes the rear opening of said tube, and means for selectively shifting said valve element in said induction tube.

8. In an automotive vehicle having a panel separating the driver's cab from the exterior of the vehicle, a heater and ventilator comprising a casing secured to said panel and on the outer side thereof from the cab, a first partition dividing said casing into two compartments, an induction tube extending through one of said compartments and having a first opening in one end communicating with said cab through said panel, a second partition dividing said one compartment into front and rear chambers, said tube having openings formed therein opening into each of said chambers, a heat exchange element positioned in the other of said compartments and dividing the same into inlet and outlet sides, said first partition having an opening formed therein between said rear chamber and the inlet side of said other compartment, a blower mounted on said casing and having an inlet opening communicating with said front chamber and the outlet side of said other compartment, a delivery tube on said blower extending through said panel, a tubular valve element adjustably mounted in said induction tube and adapted to selectively close the openings in said induction tube to said front and rear chambers, a closure portion on the rear end of said valve element coacting with said first opening in said tube whereby said valve element may be positioned to close the opening to said rear chamber while said closure exposes said first opening in said tube, and means for selectively shifting said valve element in said induction tube.

9. A heater and ventilator for an automotive vehicle comprising, a casing, a first partition dividing said casing into two compartments, an induction tube extending through one of said compartments and having a delivery end with an opening adapted to communicate with the space to be heated and ventilated, a second partition dividing said one compartment into first and second chambers, said tube having openings formed therein opening into each of said chambers, a heat exchange element positioned in the other of said compartments and dividing the same into inlet and outlet sides, said first partition having an opening formed therein between said second chamber and the inlet side of said other compartment, a blower mounted on said casing and having an inlet opening communicating with said first chamber and the outlet side of said other compartment, a delivery tube on said blower adapted to extend into the space to be heated and ventilated, a valve element slidably mounted in said induction tube and being of such a length as to selectively close the openings in said induction tube, a closure for said induction tube connected to the end of said valve element and spaced therefrom toward the delivery end of said tube whereby said element may be positioned to close the opening to said second chamber while said closure exposes the opening in the delivery end of said tube, and means for selectively shifting said valve element longitudinally of said induction tube.

10. A heater and ventilator for an automotive vehicle comprising a casing, a first partition dividing said casing into two compartments, an induction tube extending through one of said compartments and having an opening in one open end adapted to communicate with the space to be heated, a second partition dividing said one of said compartments into first and second chambers, said tube having openings formed therein opening into each of said chambers, a heat exchange element positioned in the other of said compartments and dividing the same into inlet and outlet sides, said first partition having an opening formed therein between said second chamber and the inlet side of said other compartment, a blower having an inlet opening communicating with said first chamber and the outlet side of said other compartment, a valve element adjustably mounted in said induction tube to selectively close the openings in said induction tube to said chambers, a closure portion on said valve element coacting with the opening in said one end of said tube whereby said valve element may be positioned to close the opening to said second chamber while said closure portion uncovers said opening in said one end of said tube, and means for selectively shifting said valve element in said induction tube.

JOSEPH BALDINUS.

References Cited in the file of this patent

UNITED STATES PATENTS

| Number | Name | Date |
|---|---|---|
| 2,186,988 | Osborne | Jan. 16, 1940 |